US008125957B2

(12) United States Patent
Liu et al.

(10) Patent No.: US 8,125,957 B2
(45) Date of Patent: Feb. 28, 2012

(54) METHOD AND SYSTEM FOR RADIO NETWORK ENVIRONMENT DETECTION AND REPORTING, AND MEDIA INDEPENDENT HANDOVER APPARATUS

(75) Inventors: Yuan Liu, Shenzhen (CN); Hui Zhong, Shenzhen (CN); Shu Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 663 days.

(21) Appl. No.: 12/206,267

(22) Filed: Sep. 8, 2008

(65) Prior Publication Data

US 2009/0036132 A1 Feb. 5, 2009

Related U.S. Application Data

(63) Continuation of application No. PCT/CN2007/001042, filed on Mar. 30, 2007.

(30) Foreign Application Priority Data

Apr. 3, 2006 (CN) .......................... 2006 1 0060160

(51) Int. Cl.
*H04W 36/00* (2009.01)
(52) U.S. Cl. ........................................ 370/331; 455/436
(58) Field of Classification Search .................. 370/328, 370/331, 338, 469; 455/436
See application file for complete search history.

(56) References Cited

U.S. PATENT DOCUMENTS

2003/0218995 A1  11/2003  Kim et al.
(Continued)

FOREIGN PATENT DOCUMENTS

CN  1139294 A  2/2004
(Continued)

OTHER PUBLICATIONS

"Draft IEEE Standard for Local and Metropolitan Area Networks: Media Independent Handover Services"; Draft IEEE Standard for Local and Metropolitan Area Networks; IEEE; US; vol. P802.21/D00.05; Jan. 1, 2006; pp. 1-169; XP003019188.

(Continued)

*Primary Examiner* — Brian Nguyen (57) ABSTRACT

A method and a system for radio network environment detection and reporting in a network handover and a media independent handover (MIH) apparatus are provided. The method includes the following: an MIH function (MIHF) at a terminal side initiates a network scan, and generates a parameter report on a radio network environment around the terminal including dynamic information and static information of a scanned point of access (PoA) after the scan is completed; the MIHF at the terminal side sends the parameter report on the radio network environment to an upper layer at the terminal side or to an MIHF at a network side. The method and system support homogeneous and heterogeneous network environments at the same time.

12 Claims, 3 Drawing Sheets

U.S. PATENT DOCUMENTS

| | | | |
|---|---|---|---|
| 2005/0249161 A1 | 11/2005 | Carlton | |
| 2006/0099948 A1* | 5/2006 | Hoghooghi et al. | 455/436 |
| 2006/0187882 A1* | 8/2006 | Kwak et al. | 370/331 |
| 2006/0251100 A1* | 11/2006 | Kim et al. | 370/432 |
| 2006/0258355 A1* | 11/2006 | Olvera-Hernandez et al. | 455/436 |
| 2006/0268782 A1* | 11/2006 | Kwak et al. | 370/331 |
| 2007/0072605 A1* | 3/2007 | Poczo | 455/432.2 |
| 2007/0072611 A1* | 3/2007 | Feder et al. | 455/436 |

FOREIGN PATENT DOCUMENTS

| | | |
|---|---|---|
| CN | 1578490 A | 2/2005 |
| CN | 1859750 A | 11/2006 |
| CN | 1881919 A | 12/2006 |
| EP | 1117269 A1 | 7/2001 |
| KR | 20060013058 A | 2/2006 |
| WO | 00/60895 A1 | 10/2000 |
| WO | 2005/011134 A2 | 2/2005 |

OTHER PUBLICATIONS

IEEE 802.21: Joined Harmonized Contribution: "Media Independent Handover"; Internet Citation [Online]; May 2005; pp. 1-149; XP002488344; Retrieved from the Internet: URL:http://www.ieee802.org/21/doctree/2005-05_meeting_docs/>.

Toskala, Antti—Holma, H. et al.; "WCDMA for UMTS: Radio Access for Third Generation Mobile Communications, Physical Layer"; WCDMA for UMTS: Radio Access for Third Generation Mobile Communications; John Wiley & Sons; Jan. 1, 2004; pp. 99-184; XP002517478; ISBN: 978-0-470-87096-9.

Liu Yuan, Dong Pei Ying: "The amendment for the MIH_Scan primitive"; [Online]; Apr. 30, 2006; XP002565824; Retrieved from the Internet: URL:https://mentor.ieee.org/802.21/dcn/06/21-06/0630-02/0000- proposal-for-amendment-of-mih-scan.ppt>; [retrieved on Jan. 28, 2010].

"Universal Mobile Telecommunications System (UMTS): Radio Ressource Control (RRC) protocol specification (3GPP TS 25.331 version 4.3.0 Release 4); ETSI TS 125 331"; ETSI Standards; Lis, Sophia Antipolis Cedes, France; vol. 3-R2, No. V4.3.0; Dec. 1, 2001; XP014008812; ISSN: 0000-0001.

English translation of the Written Opinion of the International Searching Authority of International Application No. PCT/CN2007/001042, dated Jul. 5, 2007.

Chinese Office Action for Chinese Patent Application No. CN 200610060160.0, dated Dec. 14, 2007, and partial English translation thereof.

Chinese Office Action for Chinese Patent Application No. CN 200610060160.0, dated Jun. 20, 2008, and partial English translation thereof.

Extended European Search Report for European Patent Application No. 07720616.7, dated Feb. 16, 2010.

International Search Report for International Application No. PCT/CN2007/001042, dated Jul. 5, 2007, and English translation thereof.

Cacace, Filippo, et al.; "Managing Mobility and Adaptation in Upcoming 802.21-Enabled Devices"; Proceedings of the 4th ACM International Workshop on Wireless Mobile Applications and Services on WLAN Hotspots (WMASH); Sep. 29, 2006; pp. 1-10; XP007905498; DOI: 10.1145/1161023.1161025; ISBN: 978-1-59593-470-3.

Communication from the European Patent Office for European Patent Application No. 07 720 616.7, dated Dec. 19, 2011; 8 pages.

* cited by examiner

METHOD AND SYSTEM FOR RADIO NETWORK ENVIRONMENT DETECTION AND REPORTING, AND MEDIA INDEPENDENT HANDOVER APPARATUS

CROSS-REFERENCE TO RELATED APPLICATIONS

This application is a continuation of International Application No. PCT/CN2007/001042, filed Mar. 30, 2007. This application claims the benefit and priority of Chinese Application No. 200610060160.0, filed Apr. 3, 2006. The entire disclosures of each of the above applications are incorporated herein by reference.

FIELD

The present disclosure relates to the technical field of media independent handover (MIH) and to a method, system, and a device for radio network environment detection and reporting at a terminal side in an MIH.

BACKGROUND

This section provides background information related to the present disclosure which is not necessarily prior art.

Currently, there are many networks having different architectures, such as the wireless local area network (WLAN) defined by the 802.11 protocol, the wireless metropolitan area network (WMAN) defined by the 802.16 protocol, and the third generation cellular mobile telecommunication networks defined by the Third Generation Partnership Project (3GPP). It is difficult for an application to conveniently perform a handover and roam in a heterogeneous network while guaranteeing the service continuity. The 802.21 is proposed for solving the above problems. The 802.21 (media independent handover service) protocol defined by the Institute of Electrical and Electronics Engineers (IEEE) is a standard providing an assisted handover function for an upper layer in the heterogeneous network to optimize the network handover process. The protocol is used to satisfy the requirements for software and hardware handover between different media, and implement relevant handover mechanisms. The object is to eventually enable a client device roaming in different networks to automatically select the best network connection type and point of access, implement seamless handover without intervention by the user, and improve the user experience of the mobile device by supporting handover between the heterogeneous networks.

Currently, in the 802.21 protocol, the network handover can be categorized into two types: one is the terminal-initiated handover, and the other is the network-initiated handover. In the network-initiated handover, the network side must know the radio network environment around the terminal, for example, information about base stations around the terminal and radio parameters of the base stations sensed by the terminal. The network side can correctly select the target base station only after knowing such information; otherwise, the decision of the network side is incorrect.

For example, in a GSM system, terminal-assisted handover is employed. That is, the detection and determination is made by a terminal, the handover process is controlled by a mobile switching center (MSC), and a base station and the terminal both participate in the handover. The terminal continually detects the radio network environment parameters of base stations of the current cell and adjacent cells during the conversation, and periodically reports the parameters to the base stations of the current cell. The base stations of the current cell determine whether to perform a handover according to the received reports of the terminal. If conditions of the handover are satisfied, the base stations send a handover request to the terminal. Therefore, it is known that the radio network environment detection and reporting of the terminal side is the basis for the network side to initiate the handover, and is important for the network-initiated handover. However, the handover of the GSM is merely between homogeneous networks, and no heterogeneous networks are involved.

The 802.21 protocol supports handovers between homogeneous and heterogeneous networks. In the network-initiated handover, the network side needs to notify the terminal side to perform the radio network environment detection and feed back the detection result to the network side as a basis for selecting the handover target. In 802.21, the terminal supports the detection and reporting of information of a variety of network media types. In a currently used method, the network side can send a scan request to the terminal, and the terminal side detects conditions of a surrounding network after receiving the request, and reports a scanned point of access (PoA) to the network side in a response. However, in current standards, the parameter detection and reporting mechanism of the radio network environment at the terminal side is imperfect, which has the following disadvantages:

1. Currently, in the network neighbor discovery of 802.21, information about the network neighbor is provided by an MIH information server. However, all of the information is static, such as the network type, address, and carrier of the PoA, and does not include dynamic information such as signal strength and power of the PoA. Thus, the comprehensive and valid information cannot be provided for the network-initiated handover.

2. The process for the terminal side to report its own radio network environment parameters to the network side is unclear. Currently, in 802.21, when the terminal side initiates a handover, the terminal side can sense the surrounding radio network environment and selects a handover candidate PoA. However, for the network-initiated handover, this method is not applicable. The network side must obtain the network conditions around the terminal in a certain way in order to correctly select a handover target PoA for the terminal, and this problem is still unsolved in the prior art.

3. Existing handover dependent commands and events cannot well support the dynamic detection and reporting of parameters of the radio network environment at the terminal side. Currently, in 802.21, primitives that support link parameter detection include MIH_Link_Parameters_Report (MIH link parameter report) and MIH_Get_Status (MIH link status obtaining command), and primitives that support neighboring PoA discovery include MIH_Scan (MIH scan command) and MIH_Link_Detected (MIH link discovery). MIH_Link_Parameters_Report is an event, and MIH_Get_Status is a command. However, both of them can obtain only parameters of the current link, and cannot obtain radio parameter information about the PoAs having not established links through the current link. The MIH_Scan command is initiated by an upper layer for scanning the PoAs, but cannot further obtain information related to the PoAs. The MIH_Link_Detected event is a notification when new PoAs are discovered, but only includes static information of the PoAs, and thus cannot achieve relevant functions either.

SUMMARY

This section provides a general summary of the disclosure, and is not a comprehensive disclosure of its full scope or all of its features.

Accordingly, the present disclosure is directed to a method and a system for radio network environment detection and reporting in a network handover and a media independent handover (MIH) apparatus.

A method for radio network environment detection and reporting in a network handover is provided in an embodiment, which includes:

a. An MIH function (MIHF) at a terminal side receives a network scan instruction, initiates a network scan, and then generates a parameter report on a radio network environment around the terminal. The parameter report includes dynamic information and static information about points of access (PoAs) around the terminal.

b. The MIHF at the terminal side sends the parameter report on the radio network environment to an upper layer at the terminal side or an MIHF at a network side.

An MIH apparatus is provided in an embodiment, which includes a network scanning and processing module. The network scanning and processing module is adapted to receive a network scan instruction, initiate a network scan, receive network scan information, generate a parameter report on a radio network environment around a terminal including dynamic information and static information of scanned PoAs, and send the parameter report on the radio network environment to an upper layer at the terminal side or an MIHF at a network side.

A system capable of implementing radio network environment detection and reporting in a network handover is provided in an embodiment, which includes an MIHF at a terminal side and an MIHF at a network side. The MIHF at the terminal side is adapted to receive a network scan instruction, initiate a network scan; receive network scan information, generate a parameter report on a radio network environment around the terminal, and send the parameter report on the radio network environment to an upper layer at the terminal side or the MIHF at the network side. The parameter report includes dynamic information and static information about PoAs around the terminal.

The present disclosure overcomes the deficiencies in the prior art. The MIHF at the terminal side scans the surrounding radio network environment to obtain the dynamic information and static information of the scanned PoA, and then sends the dynamic information and static information to the MIHF at the network side in a media independent scan response or in a registered media independent radio network environment parameter report event for a handover decision-making module at the network side to make a handover decision. The technical solutions support homogeneous and heterogeneous network environments at the same time, thereby increasing the accuracy of selecting a target PoA when the network side initiates a handover and improving the network handover efficiency.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present disclosure will become more fully understood from the detailed description given herein below for illustration only, and thus are not limitative.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
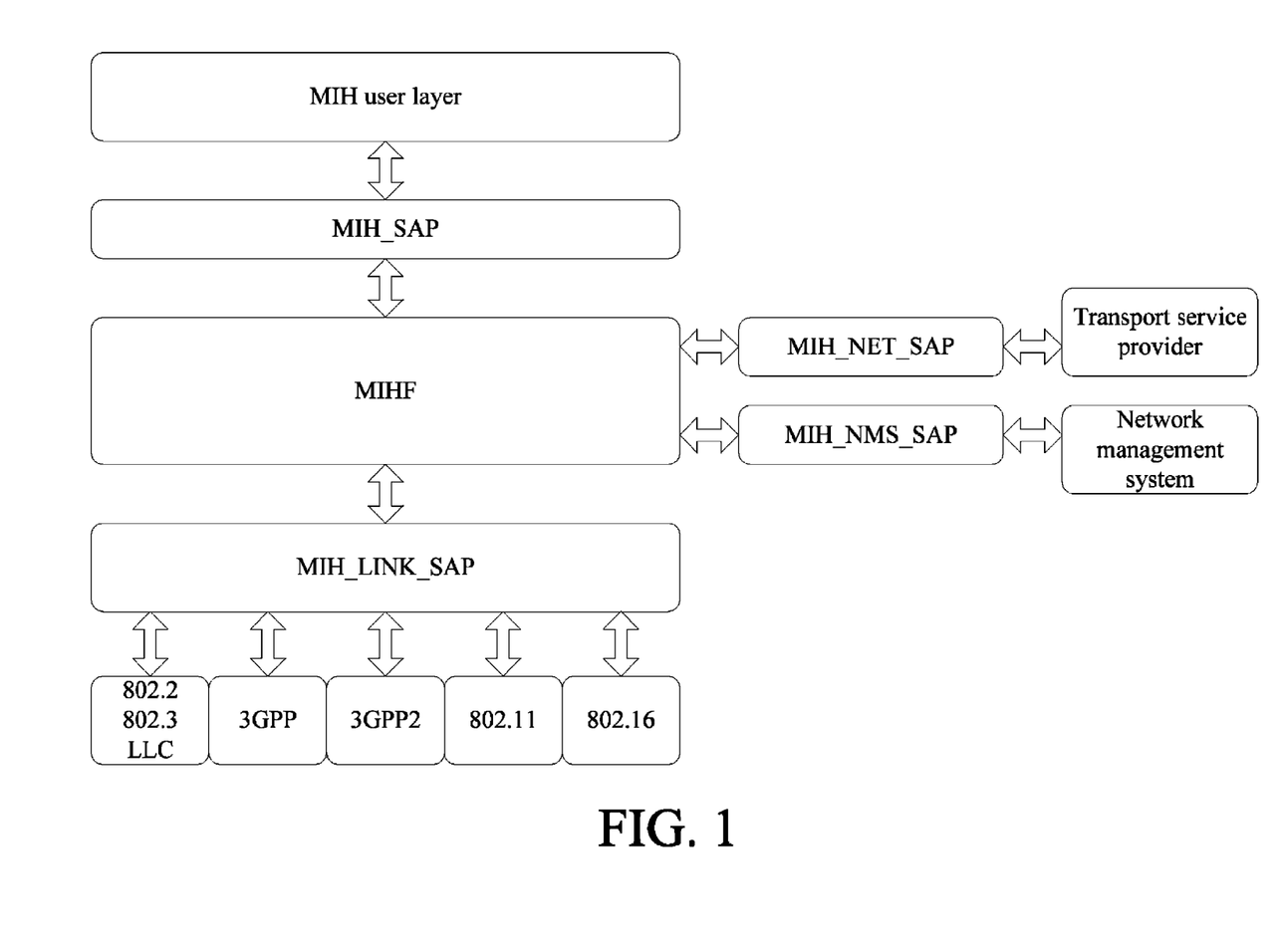
FIG. 1 is a schematic diagram of an MIHF architecture.

The present disclosure provides a system capable of implementing radio network environment detection and reporting in a network handover in an embodiment, which includes an MIHF at a terminal side and an MIHF at a network side. The MIHF at the terminal side initiates a network scan after receiving a network scan request or instruction (MIH_Scan), generates a parameter report on a homogeneous or heterogeneous radio network environment around the terminal after the scan is completed, and sends the parameter report to the MIHF at the network side or an upper layer at the terminal side. For the network side, the MIHF at the network side sends the parameter report on the radio network environment to an upper layer at the network side, for example to a handover decision-making module in the upper layer at the network side or at the terminal side. The parameter report on the radio network environment includes dynamic information of a scanned PoA. The upper layer at the terminal side or at the network side may be an MIH_SAP (media independent handover service access point) and an MIH user layer above the MIHF at the network side or at the terminal side. FIG. 1 is a schematic diagram of an MIHF architecture. As shown in FIG. 1, the portion above the MIHF is upper layers of the MIHF, and an interface entity of the MIHF, MIH_SAP, is an MIH service access point. The portion below the MIHF is media dependent link layers such as 802.11/802.16/3GPP interacting with the MIHF through an MIH_LINK_SAP. In addition, the MIHF also interacts with a transport entity and a network management entity through an MIH_NET_SAP and MIH_NMS_SAP. The network scan request or instruction is from the upper layer at the network side or the upper layer at the terminal side.

The system in this embodiment includes an MIH apparatus, that is, the MIHF, configured at the terminal side. The MIHF includes a network scanning and processing module. The network scanning and processing module is adapted to receive a network scan instruction, initiate a network scan, receive network scan information, generate a parameter report on a radio network environment around a terminal including dynamic information and static information of a scanned PoA, and send the parameter report on the radio network environment to the upper layer at the terminal side or the MIHF at the network side.

The network scanning and processing module sends the parameter report on the radio network environment to the upper layer at the terminal side or the MIHF at the network side in a media independent scan response or in a registered media independent radio network environment parameter report event.

A first embodiment of the method provided is described as follows.

The MIHF at the terminal side initiates a network scan after receiving the MIH_Scan request of the network side, generates a parameter report on a homogeneous or heterogeneous radio network environment around the terminal after the scan is completed, and sends the parameter report to the handover decision-making module at the network side.

Firstly, to obtain the dynamic information about the PoA when the MIHF at the terminal side scans, the parameters of MIH_Scan sent to the MIHF at the terminal side by the MIHF at the network side need be modified as follows:

The original MIH_Scan command request in 802.21 is defined as follows:

Prototype: MIH_Scan.request (SourceIdentifier, DestinationIdentifier, ScanResultSets)

The following table lists the original parameter definitions of the MIH_Scan request:

| Name | Type | Valid Range | Description |
| --- | --- | --- | --- |
| Source Identifier | MIHF Identifier | Any valid individual or group identifier | The identifier of entity where the request is initiated. This field may be optionally left empty if the command is local. |
| Destination Identifier | MIHF Identifier | MIH_LOCAL MIH_REMOTE | The destination identifier of request or response. This is the identifier of local or peer MIH entity. |
| ScanResultSets | Defined in related SDOs | Defined in related SDOs | Defined in related SDOs |

In the original primitive, the ScanResultSets is defined in related SDOs. The MIH_Scan is a command from an upper layer to the MIHF and should be media independent. Since particular information of the media protocols should be transparent to the upper layers, the modified primitive is defined as follows:

Prototype: MIH_Scan.request (SourceIdentifier, DestinationIdentifier, ScanRequestSets)

The following table lists the modified parameter definitions of the MIH_Scan request:

| Name | Type | Valid Range | Description |
| --- | --- | --- | --- |
| Source Identifier | MIHF Identifier | Any valid individual or group identifier | The identifier of entity where the request is initiated. This field may be optionally left empty if the command is local. |
| Destination Identifier | MIHF Identifier | MIH_LOCAL MIH_REMOTE | The destination identifier of request or response. This is the identifier of local or peer MIH entity. |
| Scan Request Sets | N/A | N/A | A list of links to be scanned by upper layers. |

In the modified primitive, the ScanResultSets is changed to ScanRequestSets. The ScanRequestSets is a list of links to be queried by the upper layers, and includes link types such as 802.11, 802.16, 3GPP and 3GPP2. The MIH layer is responsible for initiating a query to obtain the PoA information through particular network protocols. The query processes are transparent to the upper layers.

The original MIH_Scan command response in 802.21 is defined as follows:

Prototype: MIH_Scan.response (SourceIdentifier, DestinationIdentifier, Scan Response Sets)

The following table lists the original parameter definitions of the MIH_Scan response:

| Name | Type | Valid Range | Description |
| --- | --- | --- | --- |
| Source Identifier | MIHF Identifier | Any valid individual or group identifier | The identifier of entity where the request is initiated. This field may be optionally left empty if the command is local. |
| Destination Identifier | MIHF Identifier | MIH_LOCAL MIH_REMOTE | The destination identifier of request or response. This is the identifier of local or peer MIH entity. |
| Scan Response Sets | Defined in related SDOs | Defined in related SDOs | Defined in related SDOs |

The modified new primitive is defined as follows:

Prototype: MIH_Scan.confirm (SourceIdentifier, DestinationIdentifier, ScanResponseSets)

The following table lists the modified parameter definitions of the MIH_Scan response:

| Name | Type | Valid Range | Description |
| --- | --- | --- | --- |
| Source Identifier | MIHF Identifier | Any valid individual or group identifier | The identifier of entity where the request is initiated. This field may be optionally left empty if the command is local. |
| Destination Identifier | MIHF Identifier | MIH_LOCAL MIH_REMOTE | The destination identifier of request or response. This is the identifier of local or peer MIH entity. |
| Scan Response Sets | N/A | Scan response sets | The response sets includes a set of PoAs detected by the terminal and information about related radio network environment parameters. |

In the original protocol, the Scan Response Sets in the MIH_Scan response is merely defined as a set of scanned PoAs. In the modified primitive, the parameter includes static and dynamic radio network environment information of the scanned PoAs, such as:

static information of the PoA, such as network type, network identity, address and channel of the PoA, and operator;
signal strength information of the PoA when scanning;
power information of the PoA when scanning; and
information about specific media (optional).

Figure 2:
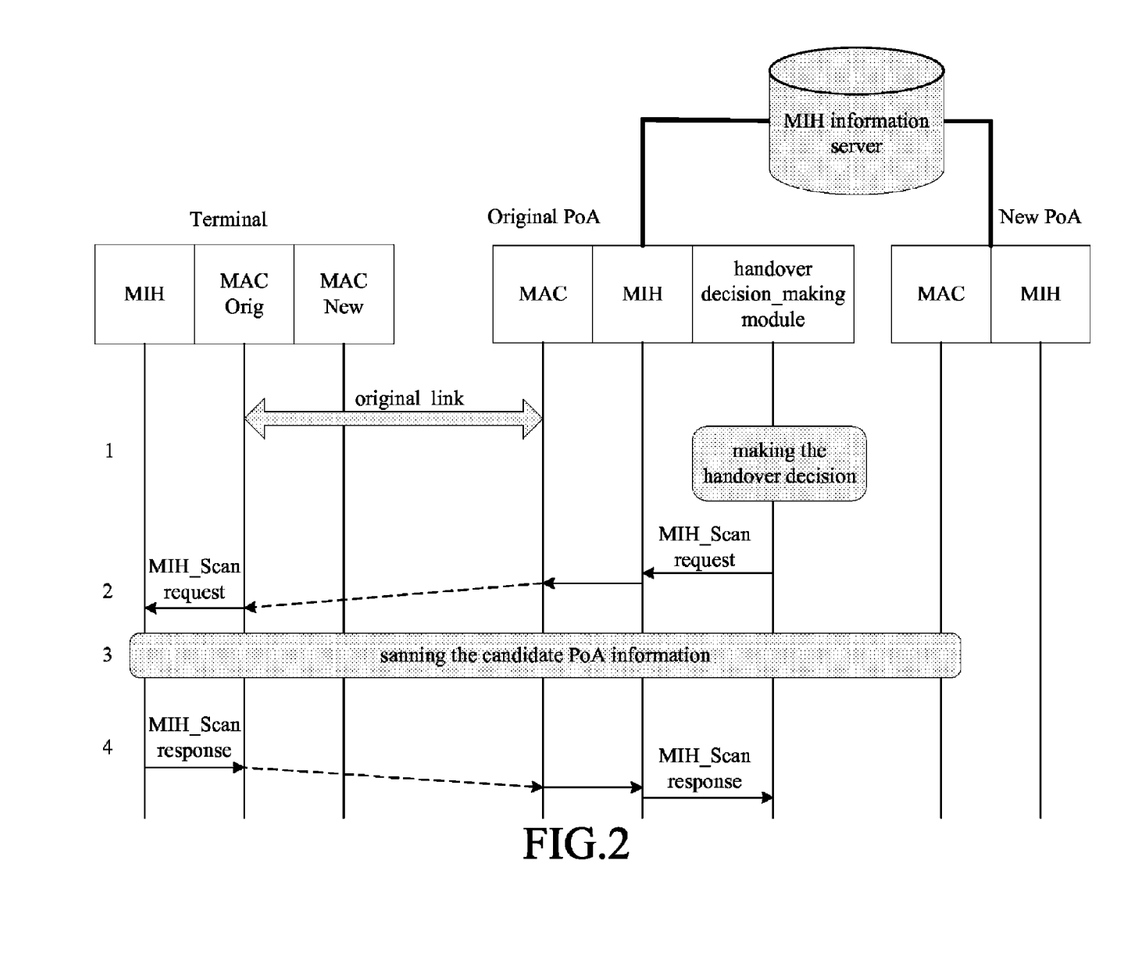
FIG. 2 is a flow chart of a method according to a first embodiment.

FIG. 2 is a flow chart of a query for the radio network environment of a terminal actively initiated by a network side.

1. A handover decision-making module at a network side initiates a handover initialization. Since incomplete static information is obtained by the network side from an MIH capability discovery procedure or an MIH information server, a correct handover candidate PoA cannot be selected for the terminal at this time.

2. The handover decision-making module at the network side sends an MIH_Scan request to its own MIHF. The MIHF sends the request to an MIHF of the terminal through the current link.

3. The MIHF at the terminal side can turn on a powered-down network device interface or awake a dormant interface after receiving the MIH_Scan request, initiates a network scan, and generates a parameter report on a homogeneous or heterogeneous radio network environment around the terminal after the scan is completed.

4. The MIHF at the terminal side sends the report to the MIHF at the network side in an MIH_Scan response through the current link. The MIHF at the network side then sends the report to the handover decision-making module. The handover decision-making module extracts contents of the report for analyzing to make a handover decision.

The above processes 2 to 4 can be periodically and repeatedly carried out for the network side to periodically detect the radio network environment around the terminal.

A second embodiment of the method is described as follows.

The network side asynchronously obtains the radio network environment report on the terminal by registering an MIH_Neighbor_Report (MIH radio network environment parameter reporting) event service. A primitive is defined as follows:

Prototype: MIH_Neighbor_Report.indication
The following table lists the parameter definitions of the MIH_Neighbor_Report primitive:

| Name | Type | Valid Range | Description |
| --- | --- | --- | --- |
| Source Identifier | MIHF Identifier | Any valid individual or group identifier | The identifier of entity where the request is initiated. This field may be optionally left empty if the command is local |
| Destination Identifier | MIHF Identifier | MIH_LOCAL MIH_REMOTE | Destination Identifier is the identifier of local or peer MIH entity |
| MacMobileTerminal | MAC Address | | MAC Address of Mobile Terminal |
| MacAccessRouter | MAC Address (Optional) | | MAC Address of current Access Router |
| Neighborhood Reports | | | Neighborhood Reports includes a set of PoAs detected by the terminal and information about related radio network environment parameters. |

Similar to the Scan Response Sets in the MIH_Scan, the Neighborhood Reports in the primitive also includes static and dynamic radio network environment information about the PoAs scanned by the terminal.

Figure 3:
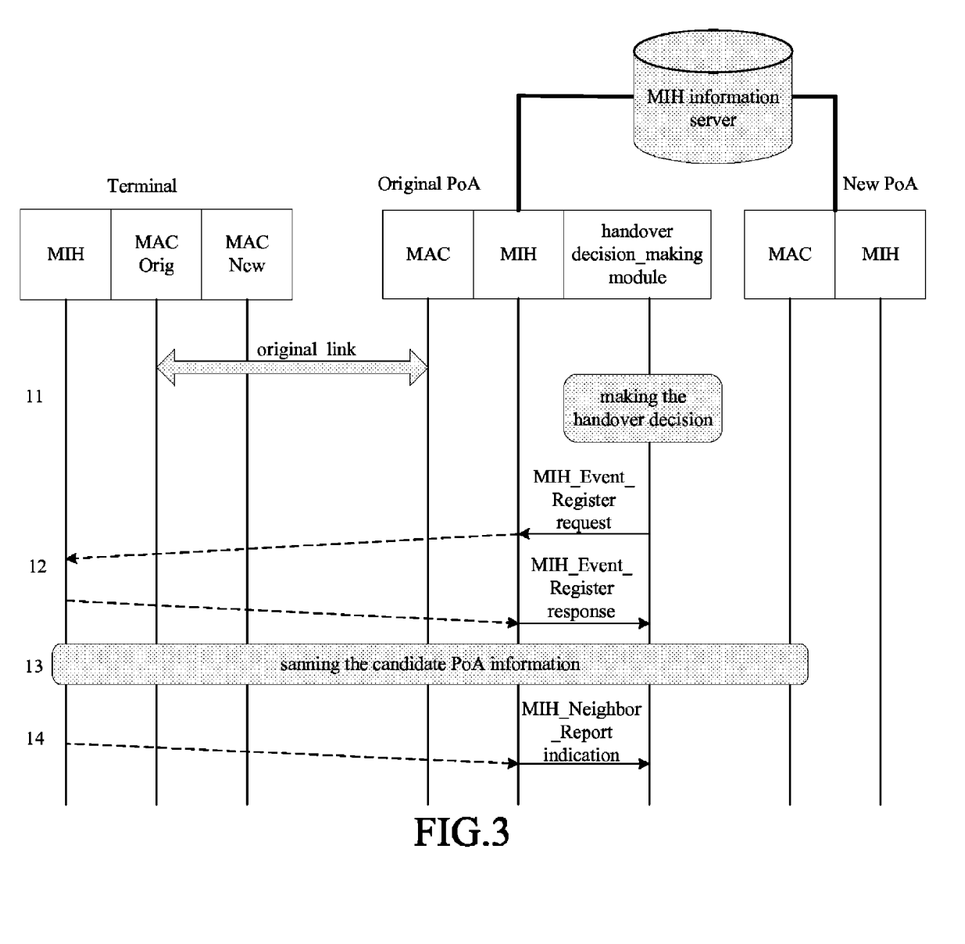
FIG. 3 is a flow chart of a method according to a second embodiment.

FIG. 3 is a flow chart of the process for the terminal to report its own radio network environment to the network side through an event registered with the network side.

11. The handover decision-making module at the network side initiates a handover initialization. Since incomplete static information is obtained by the network side from an MIH capability discovery procedure or an MIH information server, a correct handover candidate PoA cannot be selected for the terminal at this time.

12. The handover decision-making module at the network side sends an MIH_Event_Register request to its own MIHF. The MIHF sends the request to the MIHF of the terminal through the current link for registering an MIH_Neighbor_Report event, and carries a condition for the terminal to perform the network scan and a time interval parameter for reporting to the network side in the registration.

13. When the MIHF at the terminal side confirms that the scanning condition is satisfied, it performs a periodic network scan and generates a parameter report on a homogeneous or heterogeneous radio network environment around the terminal.

14. The MIHF at the terminal side sends the report to the MIHF at the network side in an MIH_Neighbor_Report event through the current link. The MIHF at the network side then sends the report to the handover decision-making module. The handover decision-making module extracts contents of the report for analyzing to make a handover decision.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for radio network environment detection and reporting in a network handover, comprising:
    receiving, by a media independent handover (MIH) function (MIHF) at a terminal side, a network scan instruction, initiating a network scan, and generating a parameter report on a radio network environment around the terminal, wherein the parameter report comprises dynamic information and static information of a point of access (PoA) around the terminal, the dynamic information of the scanned PoA comprises one or more types of information selected from a group of signal strength information, power information and media dependent dynamic network information of the PoA, the scanned static information comprises one or more types of information selected from a group of network type, network identity, and address and channel of the PoA;
    sending, by the MIHF at the terminal side, the parameter report on the radio network environment to an upper layer at the terminal side or an MIHF at a network side.

2. The method according to claim 1, wherein the MIHF at the network side sends a media independent scan command received from an upper layer thereof to the MIHF at the terminal side, or the upper layer at the terminal side sends the media independent scan command to the MIHF at the terminal side, so as to instruct the MIHF at the terminal side to initiate the network scan; and
    the MIHF at the terminal side sends the parameter report on the radio network environment to the upper layer at the terminal side or the MIHF at the network side in a media independent scan response.

3. The method according to claim 2, wherein a list of links to be scanned by the MIHF at the terminal side carried in the media independent scan command comprises link information.

4. The method according to claim 2 further comprising: turning on a powered-down network device interface or awaking a dormant interface when the MIHF at the terminal side initiates the network scan.

5. The method according to claim 1, wherein the MIHF at the network side sends a registration request of a media independent radio network environment parameter report event received from an upper layer thereof to the MIHF at the terminal side, or the upper layer at the terminal side sends the registration request of the media independent radio network environment parameter report event to the MIHF at the terminal side, and the MIHF at the terminal side performs a registration of the report event and initiates the network scan according to the registered media independent radio network environment parameter report event; and
    the MIHF at the terminal side sends the parameter report on the radio network environment to the upper layer at the terminal side or the MIHF at the network side through the registered media independent radio network environment parameter report event.

6. The method according to claim 5 further comprising: turning on a powered-down network device interface or awaking a dormant interface when the MIHF at the terminal side initiates the network scan.

7. The method according to claim 5 wherein the dynamic information about the scanned PoA comprises one or more types of information selected from a group of signal strength information, power information, and media dependent dynamic network information of the PoA; and the scanned static information comprises one or more types of information selected from a group of network type, network identity, and address and channel of the PoA.

8. The method according to claim 5, wherein when performing the registration of the media independent radio network environment parameter report event, the MIHF at the terminal side carries a condition for the terminal to perform the network scan and/or a time interval parameter for reporting to the network side.

9. An MIH apparatus, comprising a network scanning and processing module, wherein
    the network scanning and processing module receives a network scan instruction, initiate a network scan, receive network scan information, generate a parameter report on a radio network environment around a terminal comprising dynamic information and static information of a scanned PoA, and send the parameter report on the radio network environment to an upper layer at a terminal side or an MIHF at a network side, wherein the dynamic information of the scanned PoA comprises one or more types of information selected from a group of signal strength information, power information and media dependent dynamic network information of the PoA, the scanned static information comprises one or more types of information selected from a group of network type, network identity, and address and channel of the PoA.

10. The apparatus according to claim 9, wherein the network scan instruction is from the upper layer at the terminal side or an upper layer at the network side.

11. A system for implementing radio network environment detection and reporting in a network handover, comprising an MIHF at a terminal side and an MIHF at a network side, wherein the MIHF at the terminal side receives a network scan instruction, initiate a network scan, receive network scan information, generate a parameter report on a radio network environment around the terminal comprising dynamic information and static information of a PoA around the terminal, and send the parameter report on the radio network environment to an upper layer at the terminal side or the MIHF at the network side, wherein the dynamic information of the scanned PoA comprises one or more types of information selected from a group of signal strength information, power information and media dependent dynamic network information of the PoA, the scanned static information comprises one or more types of information selected from a group of network type, network identity, and address and channel of the PoA.

12. The system according to claim 11, wherein the network scan instruction is from the upper layer at the terminal side or an upper layer at the network side.

* * * * *